May 21, 1963 C. M. KLINE ETAL 3,090,133
GRAIN BIN
Filed Feb. 24, 1960 3 Sheets-Sheet 1

INVENTORS
CHARLES M. KLINE
HARRY J. HOFMEISTER, Jr.
BY WILLIAM HOBBS, Jr.
ALBERT M. BEST

Walter V. Wright, AGENT

INVENTORS
CHARLES M. KLINE
HARRY J. HOFMEISTER, Jr.
WILLIAM HOBBS, Jr.
ALBERT M. BEST

Walter V. Wright AGENT

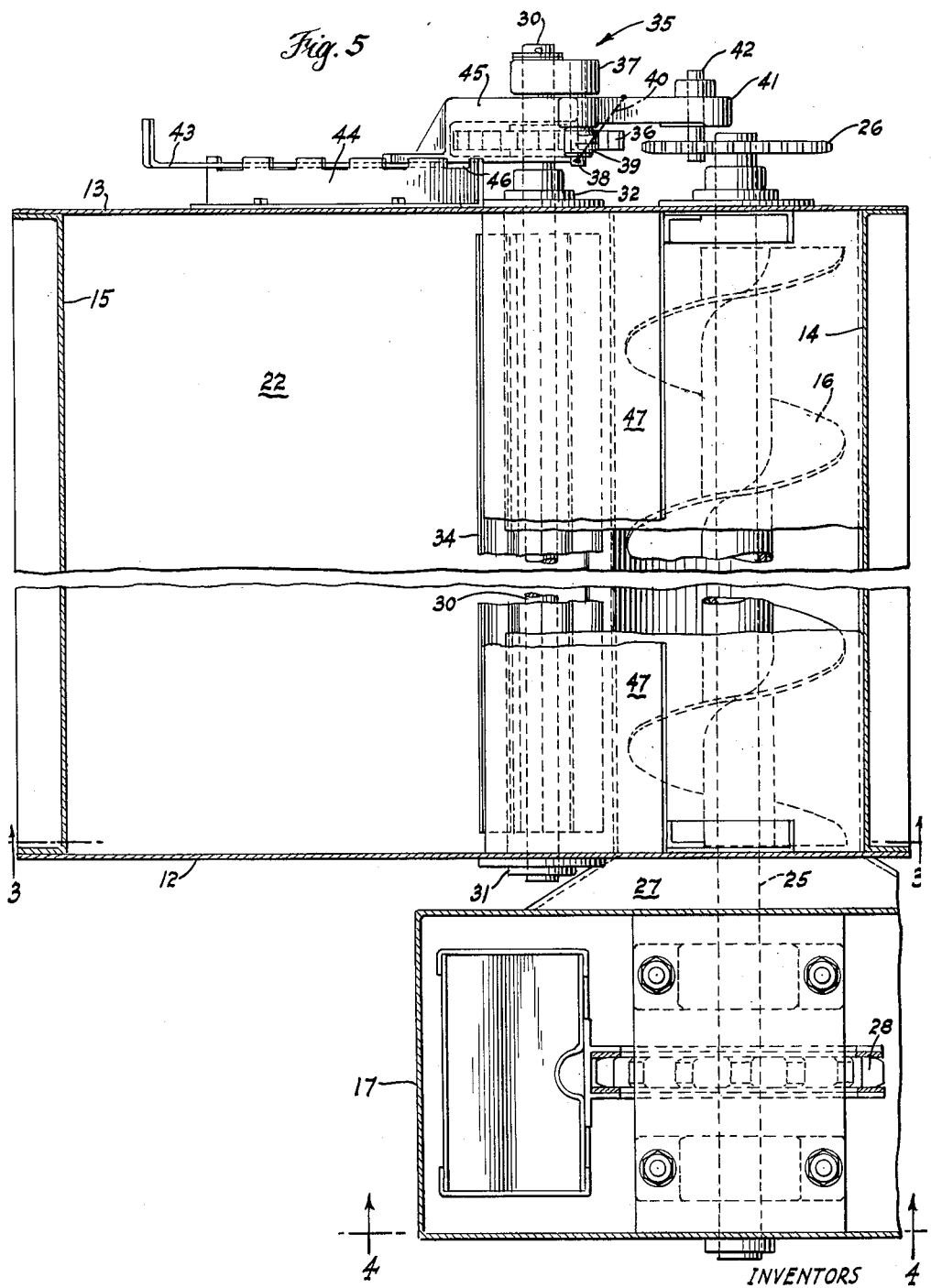

United States Patent Office 3,090,133
Patented May 21, 1963

3,090,133
GRAIN BIN
Charles M. Kline, Joanna, Harry J. Hofmeister, Jr., New Holland, William Hobbs, Jr., Lancaster, and Albert M. Best, New Holland, Pa., assignors to Sperry Rand Corporation, New Holland, Pa., a corporation of Delaware
Filed Feb. 24, 1960, Ser. No. 10,617
8 Claims. (Cl. 34—174)

This invention relates to accelerated grain drying equipment. More specifically, it relates to a circulating grain, drying bin.

The desirability of accelerating the process of drying and curing grain has led to the development of specialized grain drying equipment. One form of grain drying device that has achieved wide acclaim is the circulating grain, drying bin. The basic components of this device constitute a bin having perforate walls between which grain to be dried is deposited, means to heat air, means to force the heated air into the bin through one of the walls, through the grain between the walls and out through another wall, and various conveyors by which grain emerging from the bottom of the bin may be conveyed back up to the top. In this way, grain is continuously circulated and moved down through the bin and the drying air current therein. While devices of this type currently on the market constitute a great improvement over the slow natural drying process previously employed, they have by no means reached a state of perfection.

Wet grain, when deposited in a drying bin, is of a soft and soggy nature and tends to solidify under the pressure of the overlying mass. In this condition, the fluent properties of grain, across the width of the bin, are small and non-uniform. The tendency is for the grain to "bridge" rather than flow. A major problem in drying bins stems from the fact that as grain drys its fluent properties increase over those of wet grain. The warm dry air entering one wall of the bin picks up moisture from the grain adjacent that wall. As this air moves across the bin through the grain, it becomes cooler and more moisture laden; hence, its ability to dry the grain decreases as it progresses across the bin. As a result, a drying "front" moves slowly across the bin. The drier grain behind this "front" flows more readily than the relatively wet grain ahead of the drying front. The natural result is that the dry grain flows down through the bin more readily than the wetter grain.

This condition is augmented by the fact that once the grain has begun to flow it develops momentum tending to keep it moving. Consequently, flow channels appear behind the drying front while the wetter grain ahead of the front remains relatively still. The relatively dry grain near the air inlet wall readily passes out the bottom of the bin, is conveyed back up to the top and moves through again. The dry grain becomes drier, perhaps even charred; meanwhile its presence impedes movement of the air current to the moist grain on the other side of the bin. This reduces the drying efficiency of the air current while failing to employ the conveying mechanism to its fullest advantage. As a result, either the grain is not all dried upon completion of a desirable period of operation, or the entire mechanism must be operated for a relatively long period of time to insure complete drying. In the latter case, undesirable quantities of fuel are expended to heat the air, move it through the bin and power the conveyor mechanism. Moreover, by the time the grain adjacent the air exit wall becomes dry, the grain adjacent the air inlet wall may be "over dry" resulting in economic weight loss, or even scorched or charred beyond the point of utility.

On the other hand, if the grain can be kept moving uniformly through the bin, equal amounts of moist and dry grain will be removed from the bottom of the bin and evenly mixed by the conveying augers in transporting it back to the top of the bin. The mixture will have relatively uniform moisture content across the width of the bin. The air current will be more effective to remove moisture, since the moist grain is evenly distributed. Literally, each kernel receives its turn in the optimum drying position in the bin. The conveying mechanism achieves maximum efficiency, since it assists the drying operation by mixing as well as conveying equal amounts of moist and dry grain. In this case, the entire mass of grain is uniformly dried in a minimum period of time. Savings are realized in reduced operating costs as well as better resultant product.

The key to optimum performance of a drying bin lies in establishing and maintaining a uniform rate of movement of all the grain down through the bin to insure discharge of grain evenly from all points across the width of the bin.

The primary object of this invention is to provide a highly efficient circulating grain drying bin capable of uniformly drying a maximum amount of grain in minimum time at low cost.

Another object of this invention is the provision of a metering roll to positively discharge equal amounts of moist and drier grain to the circulating conveyor mechanism.

Another object of this invention is the provision of a novel metering arrangement that will stop flow channels from appearing in the more fluent grain while initiating movement in the less fluent grain.

A further object of this invention is the provision of metering means including a retarding baffle to stabilize the rate of downward movement of grain across the width of the bin and thereby assist uniform drying.

A further object of this invention is the provision of metering mechanism by which the rate of flow of grain through the bin may be selectively regulated.

A further object of this invention is the provision of metering means designed to prevent grain damage during the metering operation while insuring dependable non-jamming and non-bridging operation.

Another object of this invention is the provision of a metering roll arrangement wherein the roll is alleviated from bearing the weight of the overlying grain column thereby reducing the power requirements of the roll.

Further objects and advantages of this invention will become apparent from the following description and recital in the appended claims.

Figure 1:
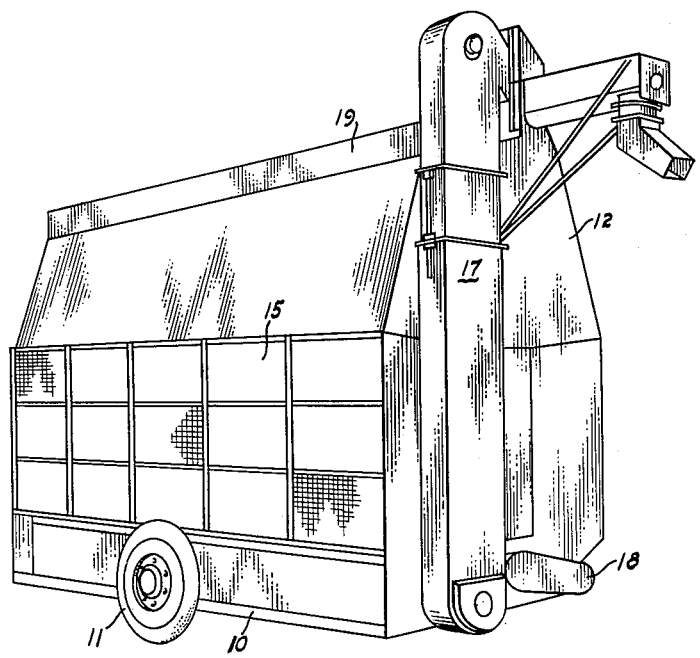
FIG. 1 is a perspective view of a grain drying device of the type in which the metering mechanism of this invention is employed.
Figure 2:
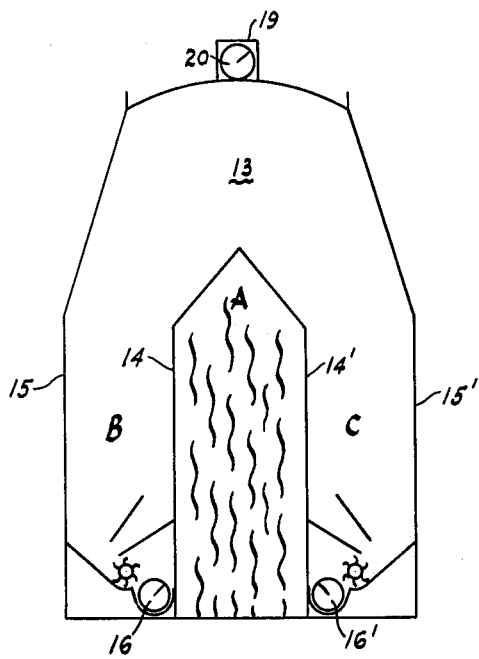
FIG. 2 represents, diagrammatically, a cross-section of the drying device of FIG. 1 and shows the location of the metering mechanism of this invention relative to the drying device as a whole.

With reference to the drawings, particularly FIGS. 1 and 2, the numeral 10 indicates a portion of the frame structure of a grain drying device. The device may advantageously be made portable by supporting frame 10 on wheels, one of which is seen at 11. Extending upwardly from frame 10 are front and rear end walls 12 and 13 and side walls 14, 14', 15 and 15'. Each of the side walls are perforated to permit passage of air therethrough. As seen in FIG. 2, walls 14 and 14' converge at their upper ends to define a plenum chamber A. Two vertical drying chambers B and C are defined by side walls 14 and 15 and 14' and 15', respectively. By means not a part of the present invention, heated air is forced into plenum chamber A. From chamber A, this air flows through walls 14 and 14' into drying chambers B and C, through the grain therein and out through walls 15 and 15'. The grain passes out the bottom of chambers B and C where augers 16 and 16' convey it toward end wall 12. Auger 16 delivers its grain directly into an elevator housing 17. Auger 16' feeds into a conventional lateral conveyor inside housing 18 (see FIG. 1). From here this grain is also deposited into elevator housing 17. The elevator conveys the grain up to the top of the bin and deposits it in an upper auger housing 19. A top auger 20 in housing 19 conveys the grain rearwardly and deposits it back into the top of the drying device. In this manner the grain is continually circulated down through bins B and C and the drying air current therein. Since bins B and C are identical, but oppositely disposed, further discussion will be limited to the invention as seen in bin B in FIG. 2.

Figure 3:
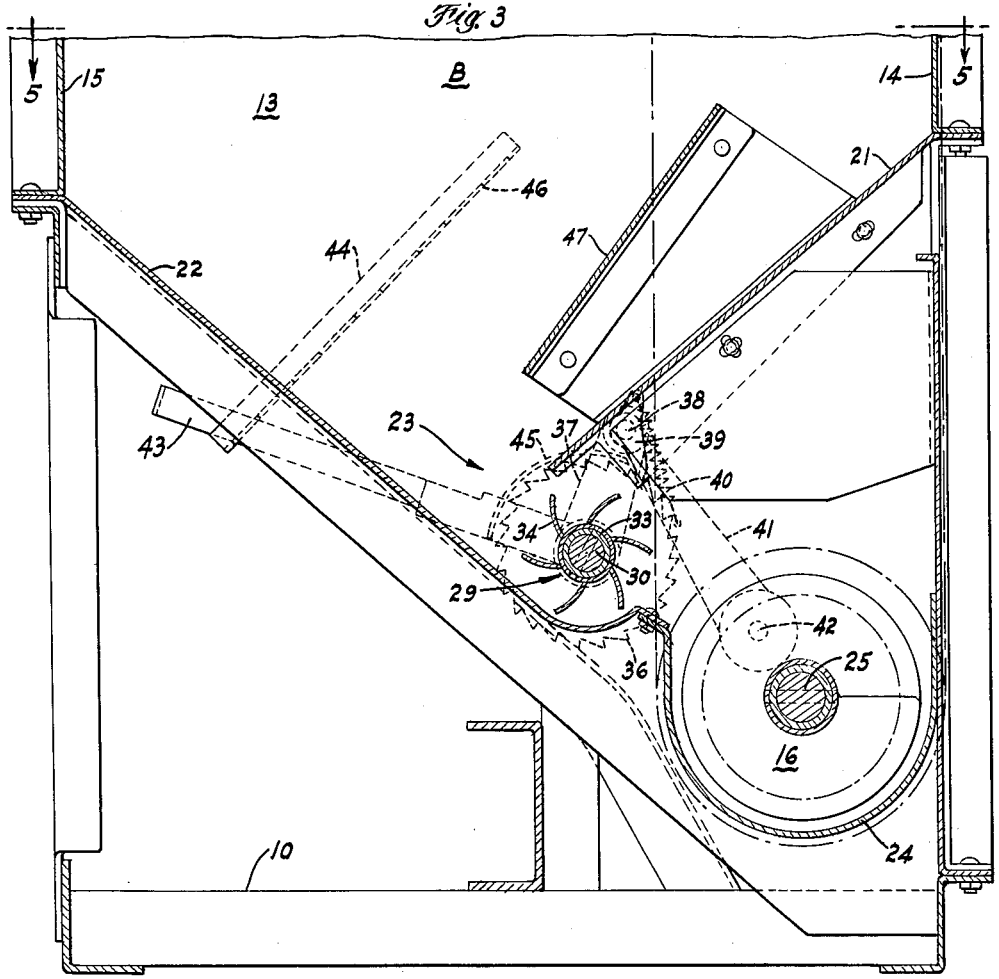
FIG. 3 is a sectional elevational view of the metering mechanism of this invention taken on the line 3—3 of FIG. 5.
Figure 4:
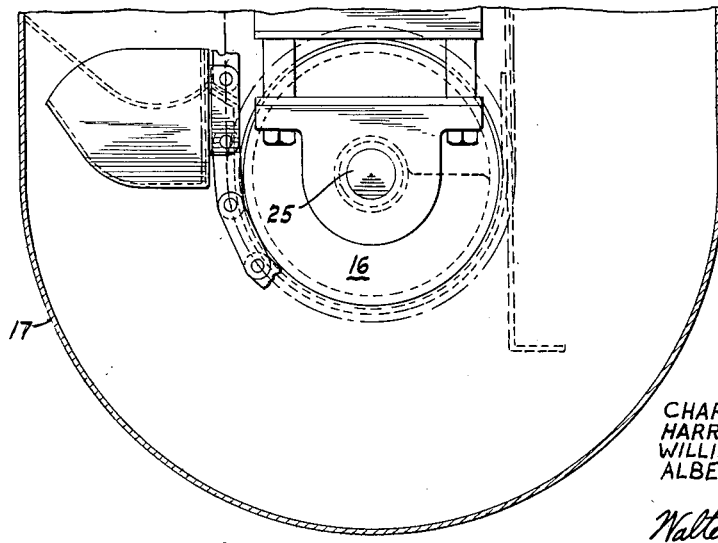
FIG. 4 is a fragmentary section taken on the line 4—4 of FIG. 5 showing the lower portion of the elevator; and, FIG. 5 is a plan sectional view taken on the line 5—5 of FIG. 3 partly broken out to condense the figure.

Referring now primarily to FIGS. 3 through 5: extending between end walls 12 and 13 and sloping downwardly and inwardly from a first side wall 14 is a first bottom wall 21. As best seen in FIG. 3, wall 21 terminates approximately midway between side walls 14 and 15. A second bottom wall 22 extends between end walls 12 and 13 and slopes downwardly and inwardly from second side wall 15. The second bottom wall 22 is spaced below the lowermost edge of bottom wall 21 to define a discharge passage 23 opening laterally toward the plane of first side wall (or the air inlet wall) 14. Discharge passage 23 leads from the interior of the bin to a longitudinally extending trough 24. Disposed in trough 24 is the grain auger 16. Shaft 25 of auger 16 extends through rear end wall 13 and is provided with a sprocket 26 which may be driven by any suitable power means (not shown). Auger 16 delivers grain through an aperture (not shown) in wall 12 to chute 27. From chute 27, the grain flows into housing 17 of the bucket elevator mechanism. Shaft 25 of auger 16 extends through housing 17 and drives sprocket 28 of the bucket elevator.

In accordance with this invention, a metering roll 29 is centrally disposed in discharge passage 23. This roll is carried by a shaft 30 journaled in bearings 31 and 32 in end walls 12 and 13, respectively. Metering roll 29 is made up of a central hub 33 having a number of metering vanes 34 extending radially therefrom. As best seen in FIGURE 3, these vanes 34 are gently curved in cross section. Metering roll 29 is driven in a step by step manner in the direction of curvature of vanes 34 (clockwise as viewed in FIGURE 3) by drive mechanism 35. Drive means 35 comprise a ratchet wheel 36 rigidly mounted on shaft 30. Arm 37 is carried by shaft 30 and may rotate relative thereto. Arm 37 extends radially beyond the periphery of ratchet wheel 36, as best seen in broken lines in FIGURE 3. A pin 38 has one end carried by arm 37. This pin lies parallel to shaft 30 and carries a driving pawl 39 on its free end. Pawl 39 is biased into driving engagement with the teeth of ratchet wheel 36 by a spring 40 (shown diagrammatically in FIGURE 5). When arm 37 moves clockwise in FIGURE 3, pawl 39 drives ratchet wheel 36 clockwise also. When arm 37 moves counterclockwise about shaft 30, pawl 39 slips over the ratchet teeth on wheel 36. Arm 37 is oscillated about shaft 30 by a connecting rod 41 eccentrically mounted by pin 42 on drive sprocket 26 of auger 16. The other end of rod 41 is connected to pin 38 between arm 37 and pawl 39. The extent of movement of each step of the metering roll may be selectively varied by a hand operated lever 43. Lever 43 has one end rotatably carried by shaft 30. The free end of lever 43 rests in anyone of five notches in a bracket 44 which is mounted on the outside of the bin on end wall 13. An arcuate control hood 45 is mounted on lever 43 in such a position that as lever 43 is rotated clockwise (FIGURE 3), hood 45 projects between pawl 39 and ratchet wheel 36. Thus, the number of teeth that pawl 39 may engage, during a single rotation of drive sprocket 26, is selectively controlled. When lever 43 engages the highest notch 46 in bracket 44, the hood 45 is completely projected between wheel 36 and pawl 39. In this case, the pawl rides on hood 45 over its entire arc of movement and metering roll 29 is not driven. When lever 43 is in the lowest notch in bracket 44 (as seen in FIGURES 3 and 5), drive means 35 turns metering roll 29 approximately 60° upon each engagement of pawl 39 with ratchet wheel 36. In operation, metering roll 29 is continually turned about its axis in incremental steps of less than a complete revolution.

Another important feature of this invention is the flow retarding baffle plate 47. This baffle extends between end walls 12 and 13 and has its ends mounted thereon. Baffle plate 47 is positioned above and extends in the same general direction as wall 21. However, the slope of baffle plate 47 is slightly steeper than that of wall 21. Consequently, a flow retarding funnel is produced between the baffle and bottom wall 21.

The step by step movement of roll 29 has a mild jarring effect which initiates step by step movement of the grain, prevents runaway flow channels from forming and breaks up any tendency for the grain to "bridge" across passage 23.

An important power saving feature of this metering roll arrangement is the mounting of the roll 29 underneath bottom wall 21. This keeps the weight of the grain off the roll except for the small portion of the roll which projects to the left of the bottom edge of wall 21 as seen in FIG. 3.

In operation, wet grain is deposited in the bin, a current of warm dry air is forced into the bin through perforations in wall 14 and out through wall 15 and the various conveyors and the metering roll are operated. The grain nearest wall 14 receives the maximum drying effect of the air and tends to flow more readily than the wetter grain near wall 15. The grain near wall 14 flows into the converging funnel between baffle plate 47 and bottom wall 21 and receives a maximum flow retarding effect therefrom. Grain nearer the center of the bin is drier than that near wall 15 but wetter than the grain nearer wall 14. This intermediately flowable grain moves vertically down on top of baffle 47 where it is forced to change direction to flow parallel to the baffle 47. As this grain reaches the bottom of baffle 47, it must again change direction to pass out through discharge passage 23. These changes of direction create a retarding effect on this portion of the grain, but to a lesser extent than the funnel through which the driest grain flows. The wettest grain, near wall 15, follows a path of least resistance along walls 15 and 22 and directly out passage 23. In this way, uniform downflow of grain is encouraged. When the metering roll 29 is operated, uniform down-flow is insured. The successive step by step rotation of this roll presents the vanes 34 directly into the flow path of the driest grain coming off the end of bottom wall 21. This interrupts the flow pattern of the grain. Any channeling or run-away tendencies of the drier grain are curtailed by direct contact with the metering vanes. The constant stopping and starting of the roll serves to prevent the build-up of momentum of the moving grain, which would occur if the metering roll were rotated at a constant speed. The wetter grain moving along wall 22 is presented more to the edge of the vanes and is simply scooped into the channels between successive pairs of vanes.

Other important results derived from this metering roll arrangement are that the grain is lifted under bottom wall 21 where it is free to fall, unimpeded, into the auger trough 24. Rotation of the metering roll in the opposite direction has a compressing, scraping effect on the grain between roll 29 and bottom wall 22. This requires more power to rotate the roll, since it is doing additional work in compressing grain and dragging it over the wall surface. Furthermore, this compressing and scraping of the grain is undesirable from the standpoint of grain damage. The effort and expense of drying the grain is completely wasted on each kernel that is crushed upon leaving the bin. The curvature of vanes 34 further serves to cushion the impact on the individual kernel when the metering roll moves in opposition thereto.

As seen from the above, the metering roll plays a critical part in creating uniform down-flow of grain through the bin as well as positively metering the grain to auger 16. An even distribution of wet and drier grain is metered to auger 16. In conveying this grain to the bucket elevator, the auger thoroughly mixes it. By the time the grain is deposited back in the top of the bin it is evenly mixed and, of course, has a lower moisture content than on the previous trip through the bin.

This uniform grain flow produces uniform drying in a minimum time and at minimum cost.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described our invention, what we claim is:

1. A grain bin comprising a vertically extending perforated air inlet wall, a vertically extending perforated air outlet wall spaced from said air inlet wall, said walls confining a column of grain therebetween, a first bottom wall extending downwardly and inwardly from said air inlet wall, a second bottom wall extending downwardly and inwardly from said air outlet wall, said bottom walls supporting said grain column thereabove and defining a discharge passage for withdrawal of grain from the bottom of said column, and a baffle plate mounted above first bottom wall and spaced from said air inlet wall, said baffle plate extending downwardly and inwardly from adjacent said air inlet wall in the same general inward direction as said first bottom wall and converging downwardly therewith to retard the downward movement of that portion of the grain column overlying said first bottom wall when grain is withdrawn through said passage.

2. A grain bin comprising a vertically extending perforated air inlet wall, a vertically extending perforated air outlet wall spaced from said air inlet wall, said walls confining a column of grain therebetween, a first bottom wall extending downwardly and inwardly from said air inlet wall, a second bottom wall extending downwardly and inwardly from said air outlet wall, said bottom walls supporting said grain column thereabove and defining a discharge passage for withdrawal of grain from the bottom of said column, and a baffle plate disposed above said first bottom wall and extending downwardly and inwardly from adjacent said air inlet wall in the same general inward direction as said first bottom wall but at a steeper slope than said first bottom wall thereby converging downwardly with the first bottom wall, said baffle plate serving to retard the downward flow of that portion of the grain column thereabove and cooperating with said first bottom wall to retard the flow of grain between said baffle and said first bottom wall.

3. A grain bin comprising a vertically extending perforated air inlet wall, a vertically extending perforated air outlet wall spaced from said air inlet wall, said walls confining a column of grain therebetween, a first bottom wall extending downwardly and inwardly from said air inlet wall and terminating approximately midway between said air inlet and air outlet walls, a second bottom wall extending downwardly and inwardly from said air outlet wall and passing underneath the lowermost portion of said first bottom wall, said first bottom wall having a lower edge spaced vertically above a portion of said second bottom wall to define a discharge passage opening toward the plane of said air inlet wall, and a baffle plate disposed above said first bottom wall and extending downwardly and inwardly from adjacent said air inlet wall in the same general inward direction as said first bottom wall but at a steeper slope than said first bottom wall thereby converging downwardly with the first bottom wall, said baffle plate serving to retard the downward flow of that portion of the grain column thereabove and cooperating with said first bottom wall to retard the flow of grain between said baffle and said first bottom wall.

4. A grain bin comprising a vertically extending perforated air inlet wall, a vertically extending perforated air outlet wall spaced from said air inlet wall, said walls confining a column of grain therebetween, a first bottom wall extending downwardly and inwardly from said air inlet wall and terminating approximately midway between said air inlet and air outlet walls, a second bottom wall extending downwardly and inwardly from said air outlet wall and passing underneath the lowermost portion of said first bottom wall, said first bottom wall having a lower edge spaced vertically above a portion of said second bottom wall to define a discharge passage opening toward the plane of said air inlet wall, a rotatable metering roll disposed in said discharge passage with all but a small portion of said roll lying beneath said first bottom wall, and a baffle plate disposed above said first bottom wall, said baffle plate extending downwardly and inwardly from adjacent said air inlet wall in the same general inward direction as said first bottom wall and converging downwardly therewith to retard the downward movement of grain adjacent said air inlet wall when grain is withdrawn through said passage.

5. A grain bin comprising a vertically extending perforated air inlet wall, a vertically extending perforated air outlet wall spaced from said air inlet wall, said walls confining a column of grain therebetween, a first bottom wall extending downwardly and inwardly from said air inlet wall and terminating approximately midway between said air inlet and air outlet walls, a second bottom wall extending downwardly and inwardly from said air outlet wall and passing underneath the lowermost portion of said first bottom wall, said first bottom wall having a lower edge spaced vertically above a portion of said second bottom wall to define a discharge passage opening toward the plane of said air inlet wall, a baffle mounted above said first bottom wall and extending downwardly and inwardly from adjacent said air inlet wall in the same general inward direction as said first bottom wall and converging downwardly with the first bottom wall to retard downward movement of grain adjacent said air inlet wall, a metering roll having a plurality of vanes extending radially therefrom, said metering roll being disposed in said discharge passage with all but a small portion of said roll lying beneath said first bottom wall, and drive means to continually turn said roll about its axis in incremental steps of less than 360° whereby the downward movement of said grain column is interrupted.

6. A grain bin comprising a vertically extending perforated air inlet wall, a vertically extending perforated air outlet wall spaced from said air inlet wall, said walls confining a column of grain therebetween, a first bottom wall extending downwardly and inwardly from said air inlet wall and terminating approximately midway between said air inlet and air outlet walls, a second bottom wall extending downwardly and inwardly from said air outlet wall and passing underneath the lower most portion of said first bottom wall, said first bottom wall having a lower edge spaced vertically above a portion of said second bottom wall to define a discharge passage opening toward the plane of said air inlet wall, a baffle disposed above said first bottom wall and extending downwardly and inwardly from adjacent said air inlet wall in the same general inward direction as said first bottom wall and converging downwardly with the first bottom wall to retard downward movement of grain adjacent said air inlet wall, a metering roll having a plurality of vanes extending radially therefrom, said metering roll being disposed in said discharge passage with all but a small portion of said roll lying beneath said first bottom wall, and drive means to continually turn said roll about its axis in incremental steps of less than 360° in a direction to feed grain out through said discharge passage above the axis of said roll.

7. In a circulating grain bin having front and rear end walls and laterally spaced perforated air inlet and air outlet side walls, the combination of a first bottom wall sloping downwardly and inwardly from said air inlet side wall, a second bottom wall sloping downwardly and inwardly from said air outlet side wall and terminating short of the plane of said air inlet side wall, said first bottom wall terminating short of said second bottom wall thereby defining a laterally opening discharge passage between said first and second bottom walls, a baffle extending between said end walls and spaced from said air inlet and air outlet side walls and said bottom walls, said baffle being disposed above said first bottom wall and sloping downwardly and inwardly from adjacent said air inlet side wall toward said second bottom wall in the same general inward direction as said first bottom wall but at a steeper slope than said first bottom wall and converging downwardly with the first bottom wall, a metering roll disposed in said discharge passage, said metering roll extending between said end walls and having its axis lying in a horizontal plane below the lowermost portion of said first bottom wall and above the lowermost portion of said second bottom wall, and drive means continually turning said metering roll about its axis in incremental steps of less than 360° in a direction to feed grain over said axis of the roll and through said lateral discharge passage.

8. A grain drying bin comprising a generally vertically extending planar perforated air inlet wall, a generally vertically extending planar perforated air outlet wall spaced from said air inlet wall, said walls confining a column of grain therebetween, a first bottom wall extending downwardly and inwardly from said air inlet wall, a second bottom wall extending downwardly and inwardly from said air outlet wall, said bottom walls supporting said grain column vertically thereabove and defining a discharge passage for withdrawal of grain from the bottom of said column, and a baffle plate mounted above said first bottom wall and spaced from said air inlet wall and said air outlet wall, said baffle plate extending downwardly and inwardly from adjacent said air inlet wall in the same general inward direction as said first bottom wall but at a steeper slope than said first bottom wall whereby said baffle plate converges downwardly with said first bottom wall to retard the downward movement of that portion of the grain column overlying said first bottom wall when grain is withdrawn through said passage.

References Cited in the file of this patent

UNITED STATES PATENTS

| | | |
|---|---|---|
| 958,483 | Dykstra | May 17, 1910 |
| 2,117,805 | Hoefling | May 17, 1938 |
| 2,410,851 | Welty | Nov. 12, 1946 |
| 2,552,093 | Goldbach et al. | May 8, 1951 |
| 2,598,388 | Hurter | May 27, 1952 |
| 2,616,592 | Boughman | Nov. 4, 1952 |
| 2,740,204 | Seltzer et al. | Apr. 3, 1956 |
| 3,000,110 | Forth et al. | Sept. 19, 1961 |
| 3,040,443 | Bopf | June 26, 1962 |